United States Patent
Inoue

(10) Patent No.: US 9,729,752 B2
(45) Date of Patent: Aug. 8, 2017

(54) COMMUNICATION APPARATUS FOR MULTI-SESSION COMMUNICATIONS, CONTROL METHOD THEREFOR, AND STORAGE MEDIUM

(71) Applicant: CANON KABUSHIKI KAISHA, Tokyo (JP)

(72) Inventor: Katsuhiro Inoue, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/700,192

(22) Filed: Apr. 30, 2015

(65) Prior Publication Data
US 2015/0319337 A1 Nov. 5, 2015

(30) Foreign Application Priority Data
May 2, 2014 (JP) ................ 2014-095257

(51) Int. Cl.
*H04N 1/327* (2006.01)
*H04N 1/42* (2006.01)
*H04N 1/00* (2006.01)
*H04N 1/333* (2006.01)

(52) U.S. Cl.
CPC ..... *H04N 1/32797* (2013.01); *H04N 1/00095* (2013.01); *H04N 1/33353* (2013.01); *H04N 1/42* (2013.01)

(58) Field of Classification Search
CPC ... H04N 1/42; H04N 1/00137; H04N 1/00095
USPC .............. 358/1.15, 1.13, 405; 709/227, 228
See application file for complete search history.

(56) References Cited

U.S. PATENT DOCUMENTS

| 7,627,097 B2 | 12/2009 | Kawabata et al. | |
| 2005/0063005 A1* | 3/2005 | Phillips | H04L 12/5835 358/1.15 |
| 2007/0019543 A1* | 1/2007 | Wei | H04L 63/1458 370/229 |
| 2010/0073719 A1* | 3/2010 | Fukushima | H04N 1/00214 358/1.15 |
| 2011/0001999 A1* | 1/2011 | Nanaumi | H04N 1/32117 358/1.14 |
| 2012/0246329 A1* | 9/2012 | Lee | H04L 69/14 709/228 |

FOREIGN PATENT DOCUMENTS

JP 2004112515 A 4/2004

* cited by examiner

*Primary Examiner* — Jamares Q Washington
(74) *Attorney, Agent, or Firm* — Rossi, Kimms & McDowell LLP

(57) ABSTRACT

A communication apparatus that avoids a situation in which all sessions are occupied by fax transmission. The communication apparatus is capable of conducting fax communications via an IP network using a plurality of sessions. An acquisition unit acquires a receive session count which indicates the number of sessions set to be used exclusively for fax reception when the plurality of sessions include any unoccupied session which is a session available for fax communications. A transmission starting unit determines whether or not sessions corresponding in number to the receive session count acquired by the acquisition unit are able to be secured as the receive sessions, and start fax transmission using the unoccupied session if the sessions are able to be secured.

12 Claims, 4 Drawing Sheets

COMMUNICATION APPARATUS FOR MULTI-SESSION COMMUNICATIONS, CONTROL METHOD THEREFOR, AND STORAGE MEDIUM

BACKGROUND OF THE INVENTION

Field of the Invention

The present invention relates to a communication apparatus, a control method therefor, and a storage medium.

Description of the Related Art

Conventionally, in a company engaged in receiving orders using a G3 facsimile machine capable of connecting to a plurality of communication lines, it is sometimes the case that all the lines are occupied by fax transmission, disabling fax reception and obstructing the operation of receiving orders.

Thus, by specifying a transmit-disable setting on a line by line basis and using the line for which the transmit-disable setting has been specified in a receive-only mode, it has become possible to receive a fax anytime using the G3 facsimile machine, and consequently, operations are no longer obstructed.

Recently, an IP facsimile machine which uses an IP network and has a facsimile communications function compliant with SIP (Session Initiation Protocol) and T.38 has been coming into wide use by replacing the G3 facsimile machine. SIP is a call control protocol used in an IP network prescribed by RFC 3261 to conduct multimedia communications using various voices, data, images, and the like. On the other hand, T.38 is one of ITU-T recommendations and is a standard which prescribes a method for translating facsimile signals used in a subscriber telephone network into IP messages for use in communications.

Known examples of such an IP facsimile machine include one which has a multi-session function capable of conducting multiplexed communications using an IP network and can simultaneously process IP facsimile transmission and reception in multiplex mode using the IP network.

Whereas conventional G3 facsimile machines have a plurality of physical lines in order to connect to multiple lines and cannot conduct communications unless each of the physical lines has a phone number, the IP facsimile machine can perform simultaneous processing in multiplex mode, once connected to the IP network using a single physical network cable. Also, the IP facsimile machine can perform simultaneous processing using a single phone number.

As with the G3 facsimile machine, even the IP facsimile machine has a problem in that all sessions can be occupied by fax transmission, disabling fax reception.

To deal with this problem, a technique is known which allows a transmit-only session or receive-only session to be specified with respect to each communications session. With this technique, each session is set to be either a transmit-only session or a receive-only session in advance, and when there is a call-out request or call-in request, only fax transmission is assigned to the transmit-only session and only fax reception is assigned to the receive-only session with reference to the settings described above (see, for example, Japanese Laid-Open Patent Publication (Kokai) No. 2004-112515).

However, with the facsimile machine disclosed in Japanese Laid-Open Patent Publication (Kokai) No. 2004-112515, if, for example, two sessions are available and one of them is set to be transmit-only while the other is set to be receive-only, even if there is an inbound call when a fax is being received using the receive-only session, the other session is transmit-only, and naturally cannot be used for fax reception.

In a business engaged in receiving orders using facsimile, since calls are received frequently, one wants to use both sessions for fax reception, but there is a problem in that if both sessions are set to be receive-only, fax transmission is disabled completely.

SUMMARY OF THE INVENTION

The present invention provides a communication apparatus that avoids a situation in which all sessions are occupied by fax transmission and control method for the communication apparatus, as well as provides a storage medium.

Accordingly, the present invention provides a communication apparatus capable of conducting fax communications via an IP network using a plurality of sessions, comprising an acquisition unit configured to acquire a receive session count which indicates the number of sessions set to be used exclusively for fax reception when the plurality of sessions include any unoccupied session which is a session available for fax communications, and a transmission starting unit configured to determine whether or not sessions corresponding in number to the receive session count acquired by the acquisition unit are able to be secured as the receive sessions, and start fax transmission using the unoccupied session if the sessions are able to be secured.

According to the present invention, when the set number of receive-only sessions can be secured, since fax transmission is started using an unoccupied session, a situation in which all sessions are occupied by fax transmission is avoided. This allows at least the set receive-only sessions to be secured.

Further features of the present invention will become apparent from the following description of exemplary embodiments (with reference to the attached drawings).

DESCRIPTION OF THE EMBODIMENTS

An embodiment of the present invention will be described in detail below with reference to the drawings.

Figure 1:
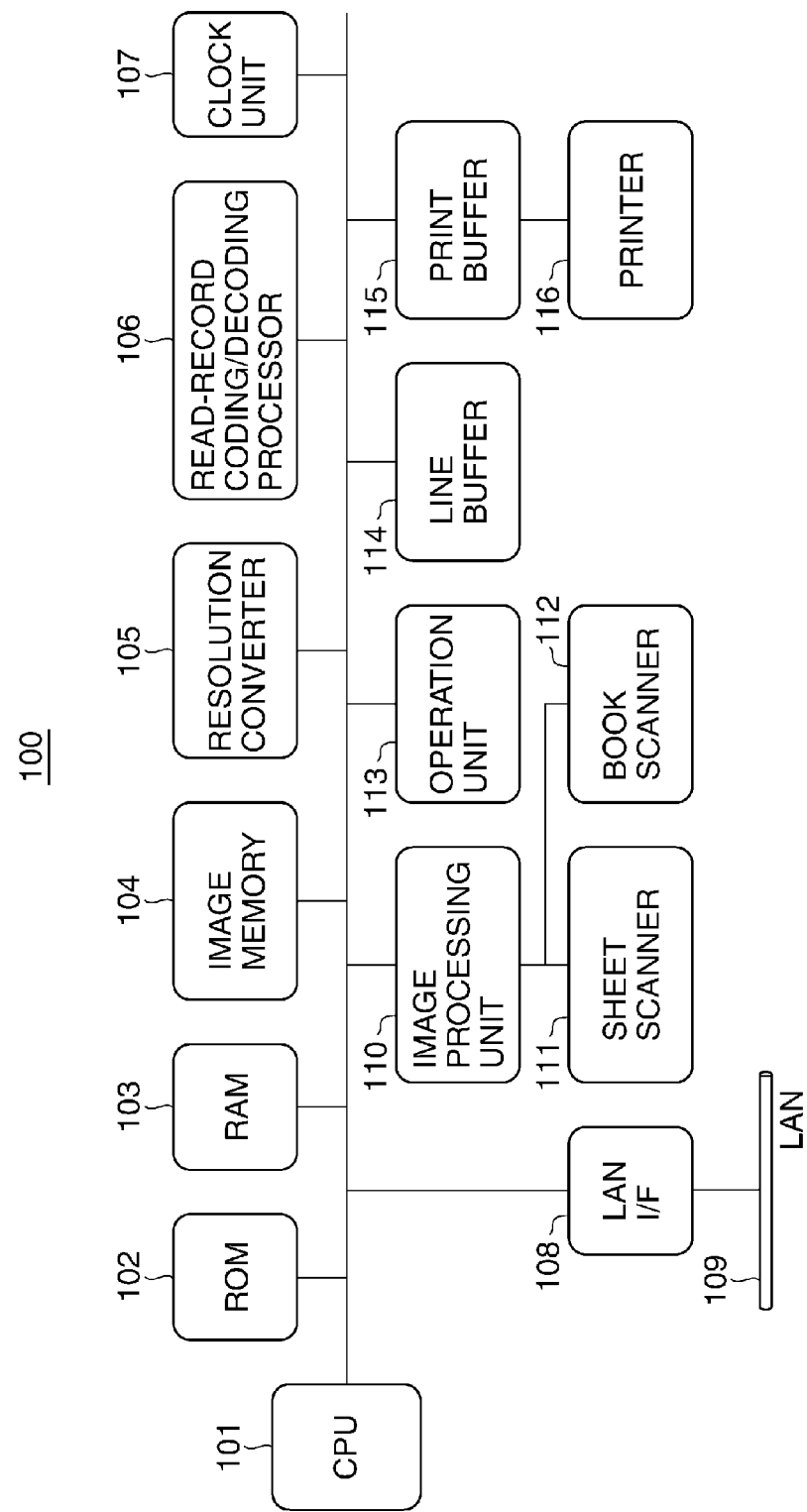
FIG. 1 is a diagram showing a schematic configuration of a communication apparatus according to an embodiment of the present invention.

FIG. 1 is a diagram showing a schematic configuration of a communication apparatus 100 according to the embodiment of the present invention.

In FIG. 1, the communication apparatus 100 includes a CPU 101, a ROM 102, a RAM 103, an image memory 104, a resolution converter 105, a read-record coding/decoding processor 106, a clock unit 107, a LAN interface 108, an image processing unit 110, an operation unit 113, a line buffer 114, and a print buffer 115, which are interconnected via a bus. Furthermore, a sheet scanner 111 and a book scanner 112 are connected to the image processing unit 110. Also, the print buffer 115 is connected to a printer 116.

The CPU 101 controls the entire communication apparatus 100. The ROM 102 stores various programs executed by the CPU 101 as well as various data. The RAM 103 is used as a work area for the CPU 101 and stores various programs and various data. The image memory 104 stores image data.

The resolution converter 105 controls resolution conversion such as millimeter-inch resolution conversion of raster data. The read-record coding/decoding processor 106 performs a coding/decoding process on image data transmitted or received by the communication apparatus 100. The clock unit 107 measures time.

The LAN interface is used to communicate with other equipment by connecting to a LAN 109, which is an IP network. The image processing unit 110 applies a correction process to image data obtained by the sheet scanner 111 or book scanner 112 and outputs high-definition image data. The operation unit 113 has various keys and a display and accepts various actions from a user and displays various information for the user.

The sheet scanner 111 and book scanner 112 are each made up of a CS image sensor, a document transport mechanism, and the like that optically read and convert a document into electric image data. The line buffer 114 is used in performing transfer control of image data. The print buffer 115 is capable of storing one page of image data to be printed by the printer 116. The printer 116 is a printing apparatus such as an LBP that prints received image data or file data on recording paper.

Figure 2:
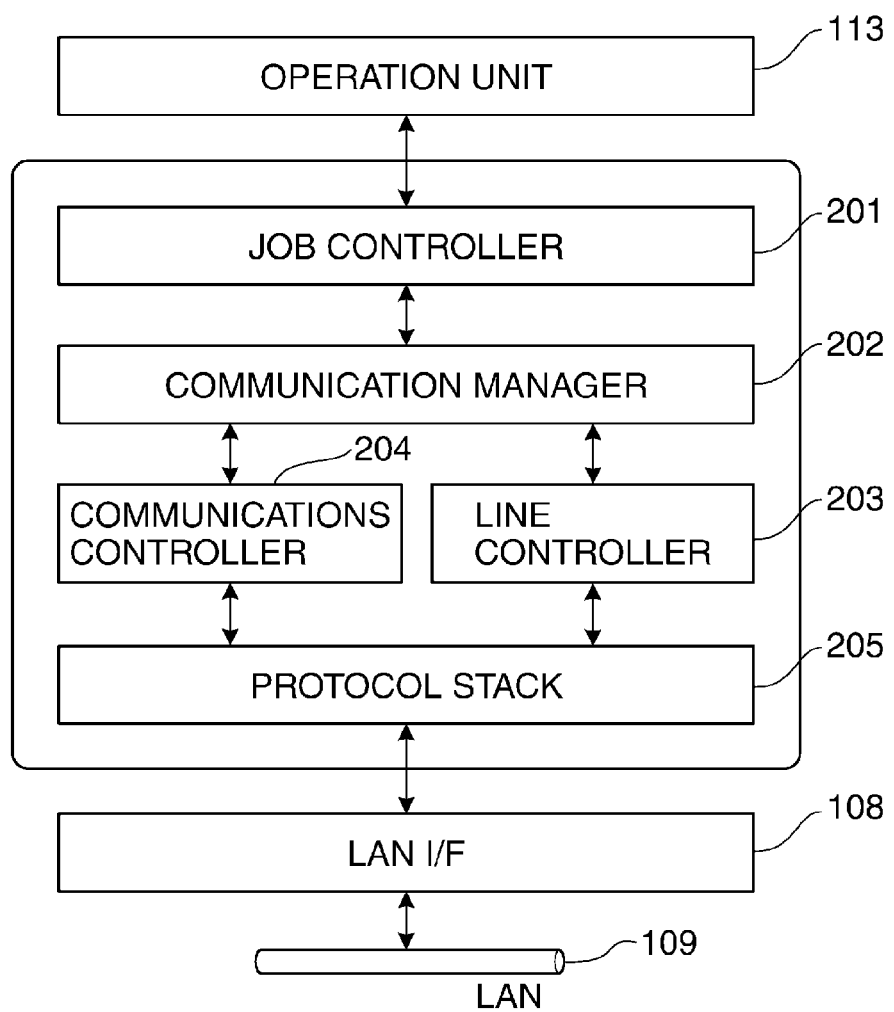
FIG. 2 is a diagram showing a software configuration of the communication apparatus shown in FIG. 1.

FIG. 2 is a diagram showing a software configuration of the communication apparatus 100 shown in FIG. 1.

In FIG. 2, software related to the present embodiment includes a job controller 201, a communication manager 202, a line controller 203, a communications controller 204, and a protocol stack 205.

The job controller 201 performs job-related control including generation of various jobs. The communication manager 202 performs communications management including determination as to whether or not a call can be originated. The line controller 203 performs control over lines, including outbound-call processing. The communications controller 204 performs communications control, including the start and end of communications and transmission and reception of data. The protocol stack 205 is a software product that carries out the SIP protocol or T.38 procedures.

In the software configuration described above, when the user gives a fax transmission command via the operation unit 113, the job controller 201 generates a transmission job, and sends a call-out request to the communication manager 202.

Based on, for example, communication resources such as a session usage situation as well as on a setting of a receive-only session count described later, the communication manager 202 determines whether or not a call can be originated. If the call can be originated, the communication manager 202 instructs the line controller 203 to perform outbound-call processing.

The line controller 203 instructs the protocol stack 205 to connect to a remote party via the SIP protocol. A SIP message created by the protocol stack 205 is transmitted to the remote party through the LAN interface 108 and LAN 109. When a session with the remote party is established by the SIP protocol, the communications controller 204 conducts data communications with the connected remote party according to the T.38 procedure of the ITU-T recommendation.

The configuration described in FIGS. 1 and 2 allows the communication apparatus 100 according to the present embodiment to conduct fax communications via an IP network using a plurality of sessions.

Figure 3:
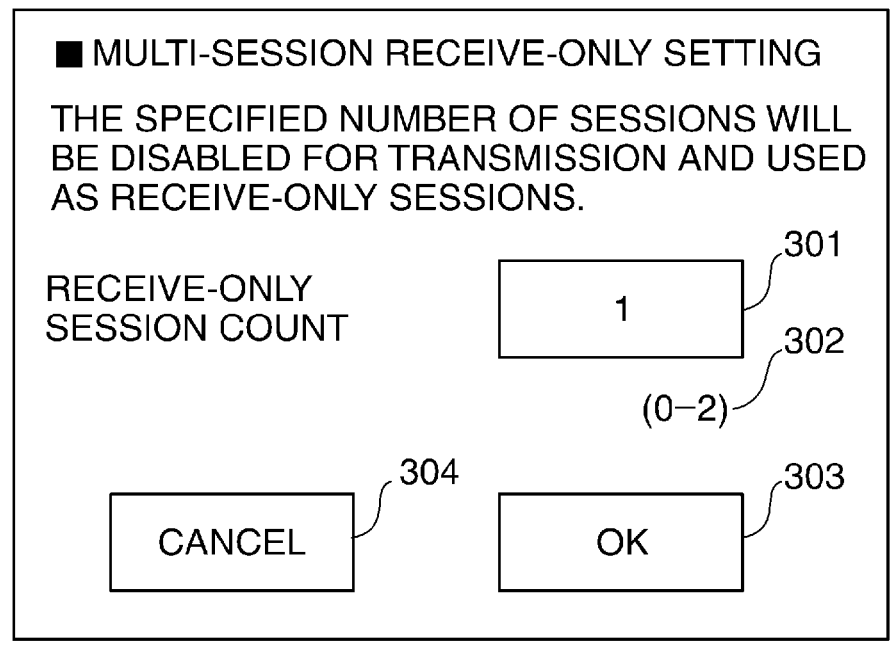
FIG. 3 is a diagram showing a setting screen displayed on an operation unit shown in FIG. 1.

FIG. 3 is a diagram showing a setting screen 300 displayed on the operation unit 113 shown in FIG. 1.

In FIG. 3, the setting screen 300 includes a receive-only session count setting field 301, the number of available sessions 302, an OK button 303, and a Cancel button 304.

The receive-only session count setting field 301 is set by the user to the receive-only session count within a range indicated by the number of available sessions 302. In the case of FIG. 3, the receive-only session count has been set to 1. This means that one session is set to be used as a receive-only session. It should be noted that when the receive-only session count setting field 301 is set to 0, all the sessions on the communication apparatus 100 are available for use both in transmission and reception.

The number of available sessions 302 indicates the receive-only session count which can be set in the receive-only session count setting field 301. For example, if the maximum number of communications sessions of the communication apparatus 100 is 2, the number of available sessions 302 is 0 to 2 as shown in FIG. 3. It should be noted that the maximum number indicated in the number of available sessions 302 may be less than the maximum number of communications sessions of the communication apparatus 100.

The OK button 303 is used to apply a setting entered in the receive-only session count setting field 301 while the Cancel button 304 is used to cancel the setting. The receive-only session count set on the setting screen 300 is stored in the RAM 103. In this way, according to the present embodiment, the receive-only session count is set by the user.

Figure 4:
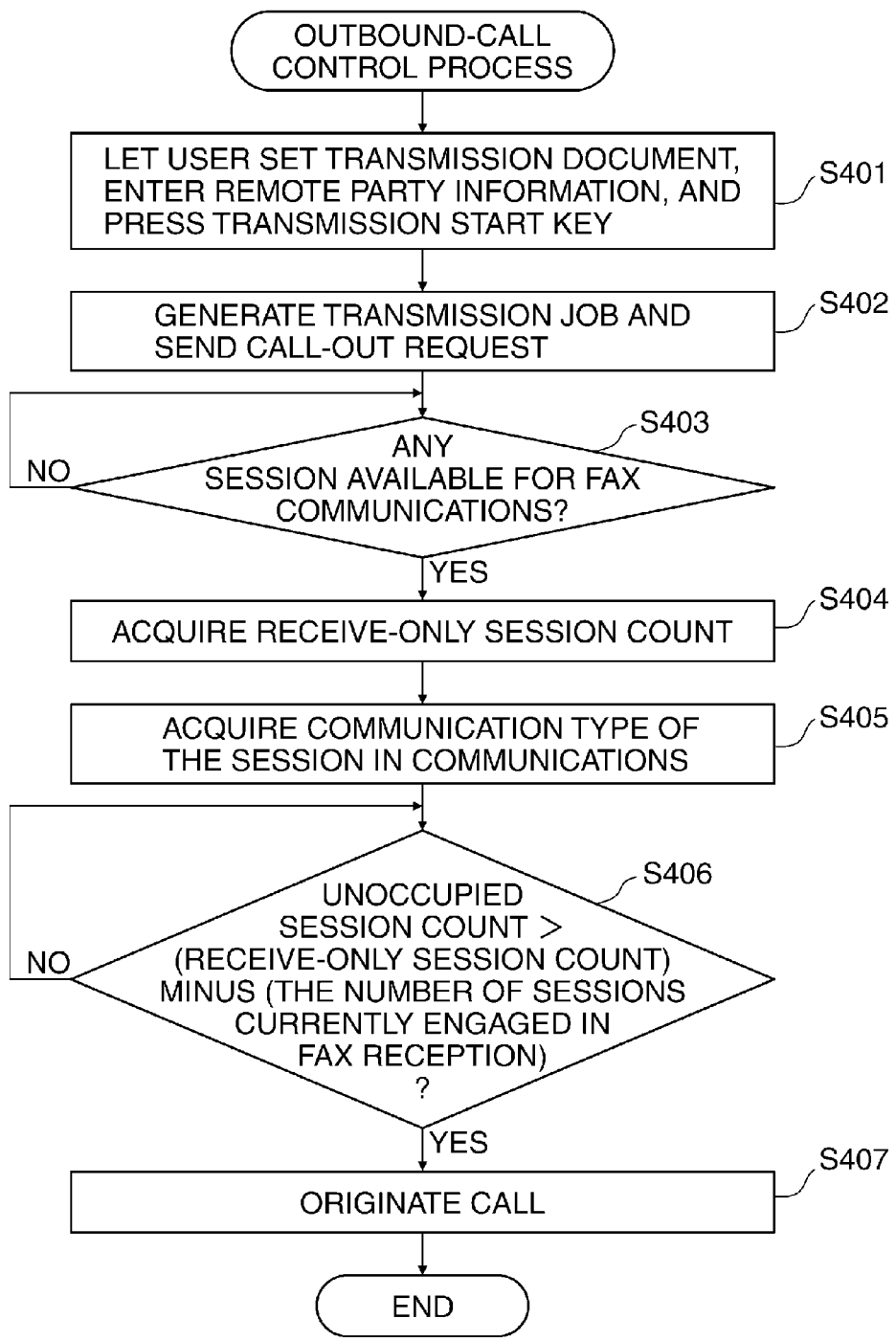
FIG. 4 is a flowchart showing procedures for an outbound-call control process carried out by a CPU shown in FIG. 1.

FIG. 4 is a flowchart showing procedures for an outbound-call control process carried out by the CPU 101 shown in FIG. 1.

In FIG. 4, first the user sets a transmission document, enters remote party information via the operation unit 113 to identify the remote party, and presses a transmission start key (step S401). Examples of the remote party information described above include a phone number, SIP URI, which are entered using a numeric keypad, a speed dial, an address list or the like.

When the transmission start key is pressed, the transmission document is read by the book scanner 112 and a transmission instruction request is issued to the job controller 201 from the operation unit 113. Upon receiving the transmission instruction request from the operation unit 113, the job controller 201 generates a transmission job based on the remote party information and sends a call-out request to the communication manager 202 (step S402).

Upon receiving the call-out request from the job controller 201, the communication manager 202 acquires a current session usage status and determines whether or not there is any session available for fax communications (step S403). The session available for fax communications is a session currently not used for fax communications and is referred to as an unoccupied session. Step S403 is repeated until it is determined that there is an unoccupied session.

As a result of the determination in step S403, if it is determined that there is the unoccupied session (YES in step S403), the communication manager 202 acquires the receive-only session count set on the setting screen 300 and stored in the RAM 103 (step S404: acquisition unit).

Next, the communication manager 202 acquires the communication type of the session in communications (step S405). The communication type represents fax transmission or fax reception. Consequently, the number of sessions currently engaged in fax reception is acquired.

Then, the communication manager 202 determines whether or not an unoccupied session count is larger than the value obtained by subtracting the number of sessions currently engaged in fax reception from the receive-only session count (step S406). In step S406, it is determined whether or not the set number of sessions can be secured as receive-only sessions when fax transmission is started using the unoccupied session.

Step S406 is repeated until an affirmative determination is made. Therefore, until the set number of sessions is secured as receive-only sessions, the CPU 101 remains on standby for an outbound call. Also, since it has been determined in step S403 that at least one session is available for communications, the communication apparatus 100 is ready for fax reception.

If it is determined in step S406 that the unoccupied session count is larger than the value obtained by subtracting the number of sessions engaged in fax reception from the receive-only session count (YES in step S406), the communication manager 202 sends a call-out request to the line controller 203. In response to the call-out request, the line controller 203 originates a call, thereby starting fax transmission (step S407), and then the processing is finished. Steps S406 and 407 described above correspond to a transmission starting unit.

According to the embodiment described above, when the set number of sessions can be secured as receive-only sessions (YES in step S406), fax transmission is started using an unoccupied session (step S407).

This allows at least the set number of receive-only sessions to be secured, without all the sessions being occupied by fax transmission. Consequently, since fax reception can be carried out using an unoccupied session among receive-only sessions, it is possible to improve convenience of the communication apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095257, filed May 2, 2014, which is hereby incorporated by reference wherein in its entirety.

What is claimed is:

1. A communication apparatus capable of performing fax communications via an IP network using a plurality of sessions, comprising:
    a setting unit configured to set the number of sessions to be used exclusively for fax reception;
    a determining unit configured to determine whether or not the number of sessions set by the setting unit is able to be used even if an unoccupied session is used for a transmission job; and
    a transmitting unit configured to perform a fax transmission using the unoccupied session based on a determination result by the determination unit,
    wherein the determining unit determines whether or not the number of sessions set by the setting unit is able to be used even if the unoccupied session is used for the transmission job by determining whether or not a number of unoccupied sessions is larger than a value obtained by subtracting a number of sessions currently used in fax reception from the number of sessions set to be used exclusively for fax reception, and
    wherein the setting unit, the determining unit, and the transmitting unit are implemented by a processor and a memory.

2. The communication apparatus according to claim 1, wherein
    the transmitting unit performs the fax transmission in a case where the determining unit determines that the number of sessions set by the setting unit is able to be used even if the unoccupied session is used for the transmission job.

3. A control method for a communication apparatus capable of performing fax communications via an IP network using a plurality of sessions, the control method comprising:
    setting the number of sessions to be used exclusively for fax reception;
    determining whether or not the set number of sessions is able to be used even if an unoccupied session is used for a transmission job; and
    performing a fax transmission using the unoccupied session based on the determining result,
    wherein determining whether or not the set number of sessions is able to be used even if the unoccupied session is used for the transmission job includes determining whether or not a number of unoccupied sessions is larger than a value obtained by subtracting a number of sessions currently used in fax reception from the number of sessions set to be used exclusively for fax reception.

4. A computer-readable non-transitory storage medium containing a program for causing a computer to implement a control method for a communication apparatus capable of performing fax communications via an IP network using a plurality of sessions, the control method comprising:

setting the number of sessions to be used exclusively for fax reception;

determining whether or not the set number of sessions is able to be used even if an unoccupied session is used for a transmission job; and performing a fax transmission using the unoccupied session based on the determining result, wherein determining whether or not the set number of sessions is able to be used even if the unoccupied session is used for the transmission job includes determining whether or not a number of unoccupied sessions is larger than a value obtained by subtracting a number of sessions currently used in fax reception from the number of sessions set to be used exclusively for fax reception.

5. The communication apparatus according to claim 1, further comprising a judging unit configured to judge whether or not there is an unoccupied session for the transmission job, wherein the judging unit is implemented by the processor and the memory.

6. The communication apparatus according to claim 1, further comprising a scanning unit configured to scan a document and generate image data, wherein the transmission job is a fax transmission job for transmitting, by a fax, the image data generated by the scanning unit.

7. The communication apparatus according to claim 1, further comprising an unoccupied session determination unit configured to determine whether the unoccupied session for the transmission job exists in response to a transmission start instruction and generation of the transmission job, the generated transmission job including information corresponding to a transmission document, wherein the unoccupied session determination unit is implemented by the processor and the memory.

8. The communication apparatus according to claim 7, further comprising an acquisition unit configured to acquire, in response to the unoccupied session determination unit determining that the unoccupied session for the transmission job exists, the number of sessions set to be used exclusively for fax reception from a storage device and the number of sessions currently used in fax reception, wherein the acquisition unit is implemented by the processor and the memory.

9. The communication apparatus according to claim 8, wherein the transmitting unit performs the fax transmission using the unoccupied session in direct response to the determining unit determining that the number of sessions set by the setting unit is able to be used even if the unoccupied session is used for the transmission job, and the determining unit repeats the determination of whether or not the number of sessions set by the setting unit is able to be used even if the unoccupied session is used for the transmission job in direct response to the determining unit determining that the number of sessions set by the setting unit is not able to be used if the unoccupied session is used for the transmission job.

10. The communication apparatus according to claim 9, further comprising a display device configured to display a setting screen that displays a receive-only session count setting field and a number of available sessions indicating a settable range for the receive-only session count setting field, wherein the setting unit sets the number of sessions to be used exclusively for fax reception according to an input received via the receive-only session count setting field.

11. The communication apparatus according to claim 1, wherein the transmitting unit performs the fax transmission using the unoccupied session in direct response to the determining unit determining that the number of sessions set by the setting unit is able to be used even if the unoccupied session is used for the transmission job, and the determining unit repeats the determination of whether or not the number of sessions set by the setting unit is able to be used even if the unoccupied session is used for the transmission job in direct response to the determining unit determining that the number of sessions set by the setting unit is not able to be used if the unoccupied session is used for the transmission job.

12. The communication apparatus according to claim 1, further comprising a display device configured to display a setting screen that displays a receive-only session count setting field and a number of available sessions indicating a settable range for the receive-only session count setting field, wherein the setting unit sets the number of sessions to be used exclusively for fax reception according to an input received via the receive-only session count setting field.

* * * * *